(12) United States Patent
Crosby

(10) Patent No.: US 6,210,088 B1
(45) Date of Patent: Apr. 3, 2001

(54) CHASSIS CONVERSION DEVICE

(76) Inventor: Brian Crosby, 114 Pond Rd., Freehold, NJ (US) 07728

( * ) Notice: Subject to any disclaimer, the term of this patent is extended or adjusted under 35 U.S.C. 154(b) by 0 days.

(21) Appl. No.: 09/577,113

(22) Filed: May 23, 2000

(51) Int. Cl.$^7$ ............................................. B60P 7/13
(52) U.S. Cl. ............................ 410/35; 410/46; 410/72; 410/82; 410/83
(58) Field of Search ............................ 410/35, 54, 68, 410/72, 73, 78, 82, 83, 46; 24/287; 220/1.5; 280/406.1

(56) References Cited

U.S. PATENT DOCUMENTS

| | | | |
|---|---|---|---|
| 3,140,005 | * 7/1964 | Hand | 220/1.5 X |
| 3,586,286 | * 6/1971 | Pratt | 410/83 |
| 3,618,999 | 11/1971 | Hlinsky . | |
| 3,701,562 | 10/1972 | Carr . | |
| 3,866,970 | * 2/1975 | Schwiebert | 410/83 |
| 4,591,307 | * 5/1986 | Clive-Smith | 410/83 |
| 4,650,381 | * 3/1987 | Durkin | 410/43 |
| 4,776,736 | 10/1988 | Tatina | 410/83 |
| 5,127,781 | 7/1992 | Roarty et al. | 410/82 |
| 5,183,375 | 2/1993 | Fenton et al. | 410/35 |
| 5,836,657 | 11/1998 | Tilley et al. | 298/1 A |
| 5,924,829 | 7/1999 | Hastings | 410/82 |
| 6,027,291 | * 2/2000 | Sain et al. | 410/35 |

* cited by examiner

Primary Examiner—Stephen T. Gordon
(74) Attorney, Agent, or Firm—Stephen R. Greiner

(57) ABSTRACT

A chassis conversion device including an elongated frame with a pair of ISO corner castings affixed to each of its front and rear ends. A pair of twist locks is affixed to each of the front and rear ends of the frame. An additional two pairs of twist locks are affixed to the frame adjacent its midpoint. The latter two pairs of twist locks are selectively retractable so that they may be lowered beneath the top of the frame. In use, the chassis conversion device may be positioned atop a gooseneck-type chassis to permit the chassis to carry either one full-length (40') ISO container or a pair of half-length (20') ISO containers.

5 Claims, 2 Drawing Sheets

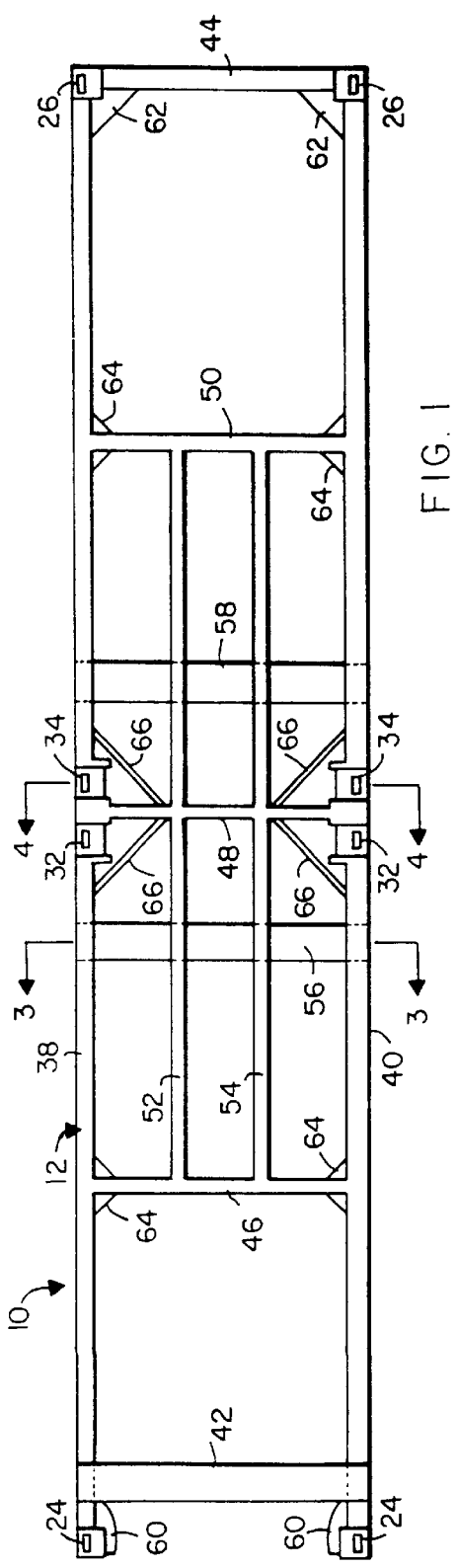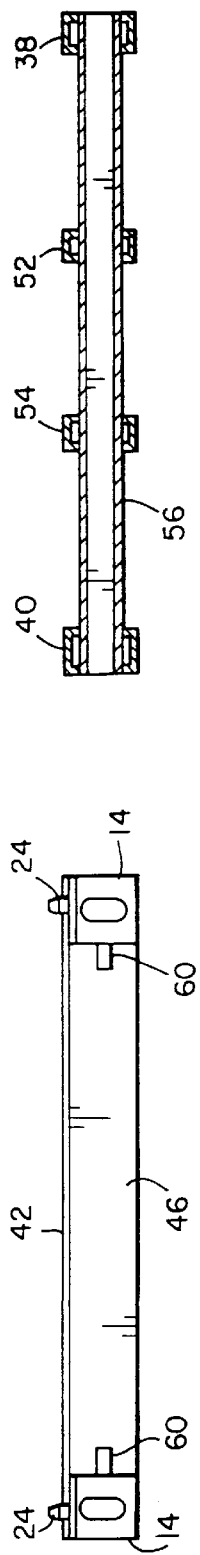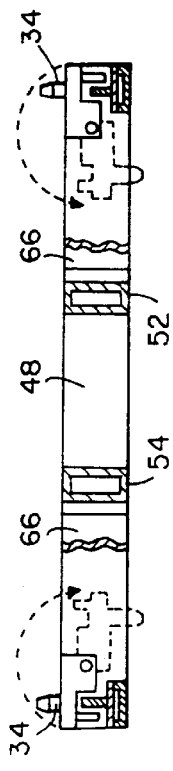

CHASSIS CONVERSION DEVICE

FIELD OF THE INVENTION

The present invention relates generally to freight accommodation devices and, more particularly, to load retainers having twist locks.

BACKGROUND OF THE INVENTION

Box-like containers are typically used to transport goods in interstate commerce. To ease burdens required in moving these containers by ship, train, truck, etc., the International Standards Organization (ISO) has required uniform dimensions. While many standard sizes have been approved by the ISO, containers having lengths of twenty feet and forty feet have gained widespread acceptance in the United States since they can be most easily and economically hauled over-the-road on trailers.

Commonly used to haul 40' ISO containers are trailers having a 40' gooseneck-type chassis with an elevated forward portions to accommodate the $5^{th}$ wheel couplers of towing tractors. The elevated forward portion of the chassis carries a pair of rearwardly directed pins for attachment to specialized castings at the front of a 40' ISO container and the rearward portion of the chassis has a pair of vertically oriented twist locks for attachment to castings at the rear of the container. Unfortunately, this container attachment system does not permit a pair of 20' ISO containers positioned in tandem to be attached to the chassis thereby limiting its utility.

SUMMARY OF THE INVENTION

In light of the problems associated with the known trailers for hauling ISO containers, it is a principal object of the invention to provide a device that is easily attached to the top of a gooseneck-type chassis that will convert it to one capable of hauling a single 40' ISO container or a pair of 20' ISO containers. In either hauling situation, operation of a gooseneck-type chassis carrying the inventive device along with one or more ISO containers will be in conformity with current highway regulations.

It is another object of the invention to provide a chassis conversion device of the type described that can be rapidly installed upon a gooseneck-type chassis without prolonged periods of instruction, without specialized tools, and without resort to modifying the chassis in any way. The chassis conversion device can also be installed upon gooseneck-type chassis of various makes and models.

It is a further object of the invention to provide a chassis conversion device that can be easily detached from a chassis when its use is not required. Lifting the device from a chassis is easily accomplished by means of a conventional forklift. The forklift may be utilized to safely stack a plurality of chassis conversion devices atop one another to conserve space when use of the devices is not required.

It is an object of the invention to provide improved elements and arrangements thereof in a chassis conversion device for the purposes described that is lightweight in construction, inexpensive to manufacture, and dependable in use.

Briefly, the chassis conversion device in accordance with this invention achieves the intended objects by featuring an elongated frame with a pair of ISO corner castings affixed to each of its front and rear ends. A pair of twist locks is affixed to both the front and rear ends of the frame. Two additional pairs of twist locks are affixed to the frame adjacent its midpoint. The latter two pairs of twist locks are selectively retractable so that they may be lowered beneath the top of the frame. The frame also includes a pair of lateral conduits for slidably receiving the projecting prongs of a forklift.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which:

FIG. 1 is a top view of a chassis conversion device in accordance with the present invention.

FIG. 2 is a front view of the chassis conversion device of FIG. 1.

FIG. 3 is a cross-sectional view taken along line 3—3 of FIG. 1.

FIG. 4 is a cross-sectional view taken along line 4—4 of FIG. 1.

Similar reference characters denote corresponding features consistently throughout the accompanying drawings.

DETAILED DESCRIPTION OF THE PREFERRED EMBODIMENT

Figure 5:
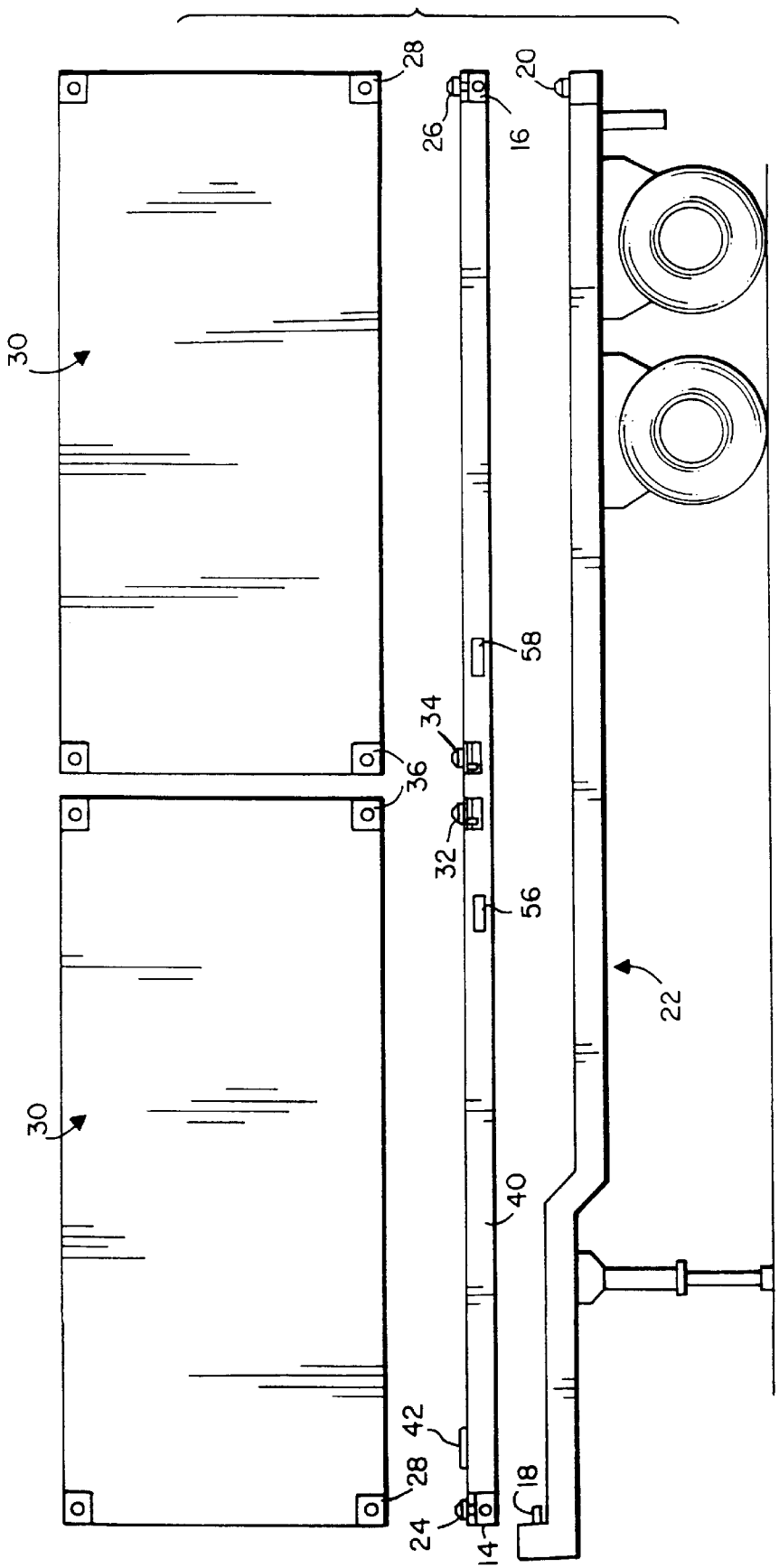
FIG. 5 is a side view of the chassis conversion device being positioned upon a gooseneck-type chassis and receiving a pair of ISO containers.

Referring now to the FIGS., a chassis conversion device in accordance with the present invention is shown at 10. Device 10 includes an elongated frame 12 formed from metallic tubing. The front and rear ends of frame 12 are each provided with a pair of ISO corner castings 14 and 16 for coupling to complementary fittings 18 and 20 on a 40' gooseneck-type chassis 22. Twist locks 24 and 26 are affixed atop castings 14 and 16 for coupling to ISO corner castings 28 at the outer ends of a pair of 20' ISO containers 30 positioned in tandem. Near the center of frame 12, two pairs of retractable twist locks 32 and 34 are provided for coupling to ISO corner castings 36 at the inner ends of containers 30.

Frame 12 includes a pair of beams 38 and 40 each about 40' long and separated at a distance equal to the width of containers 30. Beams 38 and 40 are connected at their front and rear ends by end braces 42 and 44. It should be noted that end brace 42 is a flat plate secured to the tops of beams 38 and 40 to provide clearance for the elevated front portion of chassis 22. Substantially equidistantly spaced from end braces 42 and 44 and from one another, cross braces 46, 48 and 50 also connect beams 38 and 40 together. A pair of longerons 52 and 54, oriented parallel to beams 38 and 40, connect and reinforce cross braces 46, 48 and 50.

Penetrating beams 38 and 40 and longerons 52 and 54 are a pair of conduits 56 and 58 for slidably receiving the projecting prongs of a conventional forklift (not shown). Conduits 56 and 58 are, like beams 38 and 40, braces 44–50, and longerons 52 and 54, metallic tubes of rectangular cross section. As shown, conduits 56 and 58 are positioned parallel to one another and straddle the midpoint of frame 12 so that frame 12 is balanced when elevated and transported by a forklift.

Additional features are provided to frame 12 for purposes of stiffening and reinforcement. Gussets 60, for example, connect beams 38 and 40 to corner castings 14. Gussets 62, on the other hand, connect beams 38 and 40 to end brace 44 and corner castings 16. Beams 38 and 40 and cross braces 46 and 50 are connected by gussets 64. Struts 66 serve the dual purpose of connecting the opposite ends of cross brace 48 to beams 38 and 40 and preventing inadvertent side impacts with twist locks 32 and 34.

Twist locks 24, 26, 32 and 34 are conventional in construction. Preferably, twist locks 24 and 26 are of the type shown in U.S. Pat. No. 2,963,310 issued to Andrew A. Abolins on Dec. 6, 1960, and incorporated for all purposes herein. Twist locks 32 and 34, however, are retractable and hinged so that their locking elements may be pivoted from an upright position for insertion into corner castings 28 to a stowed position beneath the top of frame 12 illustrated by broken lines in FIG. 4. Twist locks 32 and 34 may be of the type shown in U.S. Pat. No. 5,160,224 issued to Phillip Schwiebert on Nov. 3, 1992, and incorporated for all purposes herein. Of course, numerous manufacturers produce twist locks of varied construction and many equivalents may be substituted for the twist locks described hereinabove.

Use of chassis conversion device 10 is straightforward. First, with a forklift whose prongs are inserted into conduits 56 and 56, device 10 is set atop gooseneck-type chassis 22 so that corner castings 14 and 16 are in receipt of fastening elements 18 and 20. Fastening element 20, being a twist lock, is next rotated ninety degrees to lock device 10 to chassis 22. With twist locks 32 and 34 in an upright orientation as illustrated in FIG. 5, containers 30 are set atop device 10. Twist locks 24, 26, 32 and 34 are rotated ninety degrees to lock containers 30 in place atop device 10. Chassis 22 may now be towed anywhere roadway conditions permit. Containers 30 and device 10 may be offloaded upon arrival at a chosen destination, if desired, simply by reversing the steps outlined above.

A single 40' ISO container may be substituted for the pair of 20' ISO containers 30 and positioned for transport atop device 10 on chassis 22. To do this, twist locks 32 and 34 are rotated to the lowered, broken line position illustrated in FIG. 4 so that they will not interfere with the positioning of the 40' ISO container, having couplings only at its eight corners, upon device 10. Then, the 40' ISO container is set upon device 10 and its corner couplings are locked in the usual manner to twist locks 24 and 26. The 40' ISO container may now be transported as desired. Thus, device 10 permits a standard 40' gooseneck-type chassis 22 to carry either one 40' ISO container or a pair of 20' ISO containers.

While the invention has been described with a high degree of particularity, it will be appreciated by those skilled in the art that modifications may be made thereto. For example, while frame 12 has been described in relation to a 40' gooseneck-type chassis, it may be scaled up or down to accommodate chassis of any desired dimensions. Therefore, it is to be understood that the present invention is not limited to the sole embodiment described above, but encompasses any and all embodiments within the scope of the following claims.

I claim:

1. A chassis conversion device, comprising:
   an elongated frame having a front end and a rear end spaced from said front end;
   a first pair of ISO corner castings being affixed to said front end of said elongated frame;
   a second pair of ISO corner castings being affixed to said rear end of said elongated frame;
   a first pair of twist locks being affixed to said front end of said elongated frame;
   a second pair of twist locks being affixed to said rear end of said elongated frame;
   a third pair of twist locks being affixed to said frame between said front end and said rear end, said third pair of twist locks being selectively retractable so that such may be lowered beneath the top of said elongated frame; and,
   a fourth pair of twist locks being affixed to said frame adjacent said third pair of twist locks, said fourth pair of twist locks being selectively retractable so that such may be lowered beneath the top of said elongated frame.

2. The chassis conversion device according to claim 1 wherein:
   said first pair of twist locks are each respectively affixed atop one of said first pair of ISO corner castings; and,
   said second pair of twist locks are each respectively affixed atop one of said second pair of ISO corner castings.

3. The chassis conversion device according to claim 1 wherein said frame includes a pair of lateral conduits for slidably receiving the projecting prongs of a forklift.

4. A chassis conversion device, comprising:
   an elongated frame including:
      a pair of spaced apart beams each having a front end and a rear end;
      a first end brace connecting said front ends of said spaced apart beams together;
      a second end brace connecting said rear ends of said spaced apart beams together;
      a plurality of cross braces connecting said spaced apart beams together between said front and rear ends thereof;
      at least one longeron positioned between said spaced apart beams and connecting said plurality of cross braces to one another;
      a pair of spaced apart conduits penetrating said beams and said at least one longeron for slidably receiving the projecting prongs of a forklift;
   a first pair of ISO corner castings being affixed to said front ends of said spaced apart beams;
   a second pair of ISO corner castings being affixed to said rear ends of said spaced apart beams;
   a first pair of twist locks each being respectively affixed atop one of said first pair of ISO corner castings;
   a second pair of twist locks each being respectively affixed atop one of said second pair of ISO corner castings;
   a third pair of twist-locks each being respectively being affixed to one of said spaced apart beams between said front end and said rear end thereof, said third pair of twist locks being selectively retractable so that such may be lowered beneath the tops of said spaced apart beams; and,
   a fourth pair of twist locks each being respectively affixed to one of said spaced apart beams adjacent one of said third pair of twist locks, said fourth pair of twist locks being selectively retractable so that such may be lowered beneath the tops of said spaced apart beams.

5. A chassis conversion device, comprising:
   an elongated frame including:
      a pair of spaced apart beams each having a front end and a rear end;
      a first end brace connecting said front ends of said spaced apart beams together, said first end brace being a flat plate secured across the tops of said spaced apart beams;

a second end brace connecting said rear ends of said spaced apart beams together;

a plurality of cross braces connecting said spaced apart beams together between said front and rear ends thereof;

a pair of spaced apart longerons positioned between said spaced apart beams and connecting said plurality of cross braces to one another;

a pair of spaced apart conduits penetrating said beams and said longerons for slidably receiving the projecting prongs of a forklift;

a first pair of ISO corner castings being affixed to said front ends of said spaced apart beams;

a second pair of ISO corner castings being affixed to said rear ends of said spaced apart beams;

a first pair of twist locks each being respectively affixed atop one of said first pair of ISO corner castings;

a second pair of twist locks each being respectively affixed atop one of said second pair of ISO corner castings;

a third pair of twist locks each being respectively being affixed to one of said spaced apart beams between said front end and said rear end thereof, said third pair of twist locks being selectively pivotable to a position beneath the tops of said spaced apart beams; and, a fourth pair of twist locks each being respectively affixed to one of said spaced apart beams adjacent one of said third pair of twist locks, said fourth pair of twist locks being selectively pivotable to a position beneath the tops of said spaced apart beams.

* * * * *